United States Patent [19]

Wetzel et al.

[11] Patent Number: 5,066,476
[45] Date of Patent: Nov. 19, 1991

[54] METHOD OF PRODUCING HYDROGEN-RICH GAS

[75] Inventors: Rolf Wetzel, Heiligenhaus; Bernhard Firnhaber, Essen, both of Fed. Rep. of Germany

[73] Assignee: Krupp Koppers GmbH, Essen, Fed. Rep. of Germany

[21] Appl. No.: 550,105

[22] Filed: Jul. 6, 1990

[30] Foreign Application Priority Data

Aug. 2, 1989 [DE] Fed. Rep. of Germany ....... 3925564

[51] Int. Cl.$^5$ ................................................ C01B 3/02
[52] U.S. Cl. ................................ 423/648.1; 48/197 R
[58] Field of Search .................... 423/648.1; 48/197 R

[56] References Cited

U.S. PATENT DOCUMENTS 4,007,018 2/1977 Slater et al. ............................ 48/215
4,801,440 1/1989 Najjak et al. ...................... 423/648.1

Primary Examiner—Wayne A. Langel
Attorney, Agent, or Firm—Michael J. Striker

[57] ABSTRACT

A gas with a hydrogen content of at least 85 volume percent of partial oxidation crude gas is produced in a method including cooling of the gas after waste heat boiler of a gasifier by adding converted circulating gas in a quenching zone. The resulting gas mixture after corresponding gas treatment is subjected to a CO-conversion and then separated into a circulating gas partial stream and a product gas partial stream. The circulating gas partial stream is supplied back after a corresponding compression to the quenching zone, while the product gas partial stream after a so-called acid gas washing is subjected to a further gas treatment in correspondence with a desired use.

13 Claims, 1 Drawing Sheet

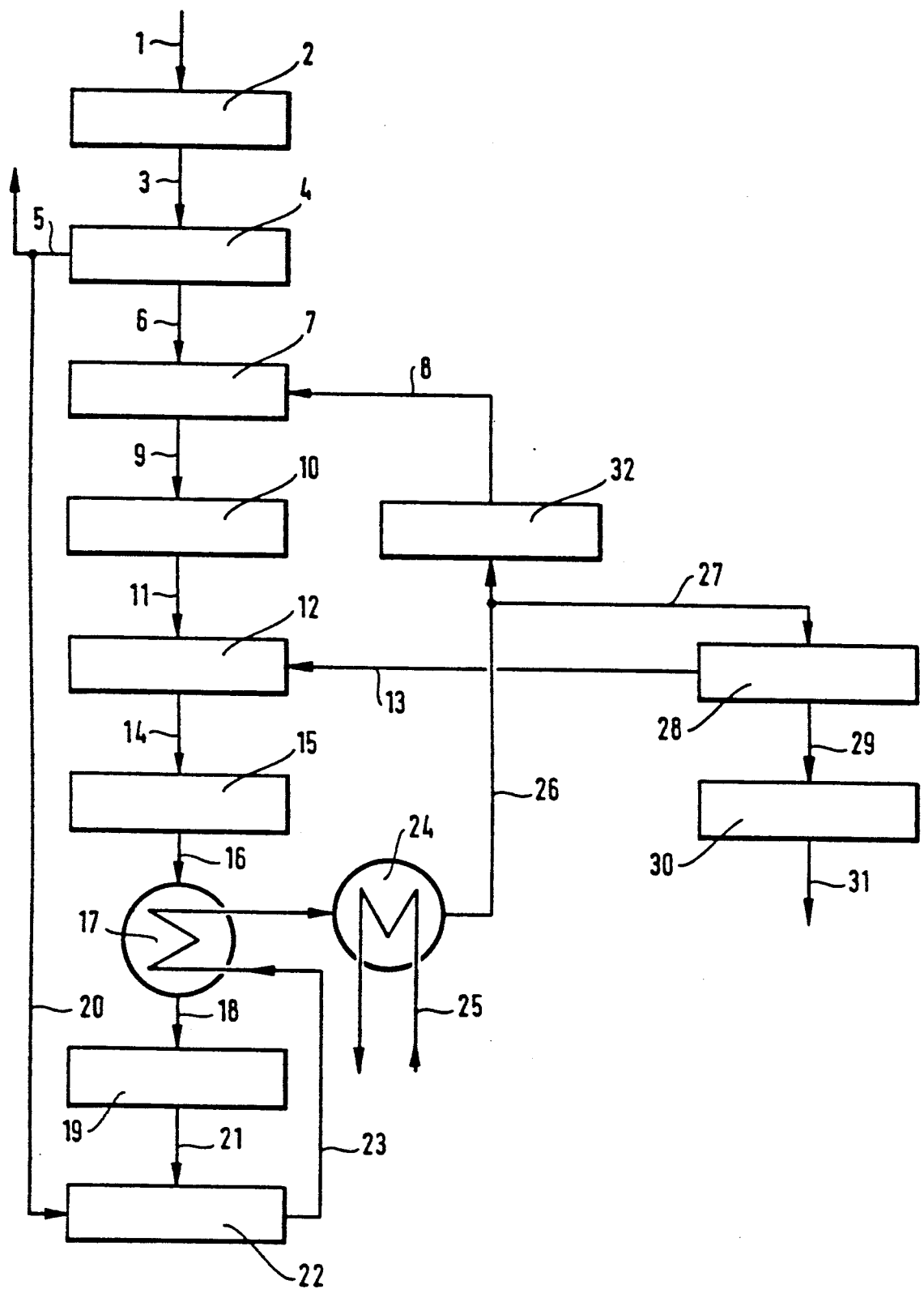

METHOD OF PRODUCING HYDROGEN-RICH GAS

BACKGROUND OF THE INVENTION

The present invention relates to a method of producing a hydrogen-rich gas with a hydrogen content of at least 85 volume percent.

More particularly, it relates to a method of producing a hydrogen-rich gas by gasification (partial oxidation) of finely granular to pulverulent fuels at temperatures above the slag melting point, wherein the produced partial oxidation crude gas is indirectly cooled with steam generation in a waste heat boiler located after the gasifier and is subjected then to a de-dusting, a catalytic CO-conversion and a desulfurization and $CO_2$ removal.

The partial oxidation crude gas produced during gasification of finely granular to pulverulent fuels has, depending on the composition of the used fuel and the reaction conditions of the gasification, a ratio of carbon monoxide to hydrogen which can be in the region between 1:1 to 2.7:1. For producing a hydrogen-rich gas which for example must be used for synthesis of ammonia or for hydrating of organic compounds, it is however required that the ratio of carbon monoxide to hydrogen be lowered to the value under 0.1. For obtaining these values the excessive CO must be converted into hydrogen in accordance with the CO-conversion reaction $$CO + H_2O \rightarrow H_2 + CO_2$$

Methods for producing a hydrogen-rich gas of the above mentioned general type are known. When the catalyst used for the catalytic conversion reaction is not sulfur resistant, the desulfurization of the gas is often performed before the conversion and not after. For the conversion itself, it is required that the gas to be converted be loaded with water vapor before entering the conversion reactor, and after the conversion cleaned from the excessive vapor again. For this purpose so-called moisturizing-demoisturizing systems are known. During the utilization of sulfur resistant conversion catalysts, the loading of the partial oxidation gas with water vapor can be performed however in such a manner that it is directly injected into the hot gas before the de-dusting, and after the conversion the excessive vapor is again condensed from the gas. A condensate return in the hot partial oxidation crude gas is however possible only to a limited extent when the gas must be de-dusted in a dry process. Depending on the utilized methods for moisturizing and de-moisturizing of the gas, in each case significant heat quantities in low temperature region are withdrawn with the excessive vapor condensate. Simultaneously, the intensive heat exchange for heating of the gas and the condensation of the excessive vapor require high apparatus expenses.

SUMMARY OF THE INVENTION

Accordingly, it is an object of the present invention to provide a method of producing a hydrogen-rich gas, which avoids the disadvantages of the prior art.

More particularly, it is an object of the present invention to provide a method of producing a hydrogen-rich gas in which the above mentioned energy and aparatus disadvantages are eliminated.

It is also an object of the present invention to provide such a method in which simultaneously the total efficiency of hydrogen recovery of finely granular to pulverulent fuels is significantly improved and the construction of the total installation is simplified.

In keeping with these objects and with others which will become apparent hereinafter, one feature of the present invention resides, briefly stated, in a method of producing a hydrogen-rich gas with a hydrogen content of at least 85 volume percent by gasifying (partial oxidation) of finely granular to pulverulent fuels at temperatures above the slag melting point, wherein the produced partial oxidation crude gas is indirectly cooled with steam generation in a waste heat boiler located after the gasifier and then subjected to a de-dusting, a catalytic CO-conversion, as well as a de-sulfurization and $CO_2$-removal, which is characterized by the following features:

a) the partial oxidation crude gas is further cooled after the waste heat boiler by addition of converted circulating gas, b) the produced gas mixture is subjected to a dry de-dusting, c) the de-dusted gas mixture is saturated with utilization of condensate produced during the cooling of the product gas partial stream and washed at dew point of the gas, d) the cleaned gas mixture after preheating to the initiating temperature of the conversion reaction and in some cases after admixing of further hydrogen for adjusting the ratio of hydrogen to carbon monoxide required for the conversion, is subjected to a CO-conversion in presence of a sulfur resistant catalyst, e) the CO-poor gas leaving the conversion reaction is cooled close to its water vapor dew point and a then subdivided into a circulating gas stream and a product gas partial stream, f) the circulating gas partial stream after respective condensation is mixed to the partial oxidation crude gas in stage a), and g) the product gas partial stream is subjected to a cooling for water vapor condensation, a de-sulfurization and $CO_2$-removal as well as to a further gas treatment corresponding to a further application.

In accordance with another feature of the present invention, the ratio between the circulating gas partial stream and the product gas partial stream is in the region between 0.5 and 4, preferably between 1 and 2.

Still another feature of the present invention is that the partial oxidation crude gas is supplied to the quenching zone at temperatures between 600° and 1,450° C., preferably between 800° and 1,200° C. and mixed therewith with the converted circulating gas, while the temperature of the produced gas mixture is lowered to the value between 200° and 800° C., preferably between 300° and 450° C.

In accordance with a further feature of the present invention, during the conversion of the cleaned gas mixture, between 60 and 95%, preferably between 80 and 95% of the supplied carbon monoxide is converted.

Another feature of the present invention is that from the wet washing of the gas mixture, a partial stream of the loaded washing water is withdrawn, purified and supplied in the preceding saturator.

Still a further feature of the present invention is that the molar $CO/H_2$ ratio in the product gas partial stream is continuously analytically monitored, and in the event of operational changes is adjusted by changing the ratio between the circulating gas partial stream and the product gas partial stream to the desired value.

Finally, this ratio is changed so that the partial stream of the circulating gas in a quantity of 0.2–1.0 Nm³/kg carbon$_{wf}$ (wf=water free), preferably 0.2–0.6 Nm³/kg carbon$_{wf}$ is supplied to the burners of the gasifier through a central lance and there is used instead of water vapor for temperature moderation during the gasification.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing schematically a flow diagram of the method of producing a hydrogen-rich gas in accordance with the present invention.

DESCRIPTION OF THE PREFERRED EMBODIMENTS

The partial oxidation crude gas which has been cooled in the waste heat boiler to temperatures between 600° and 1,450° C., preferably between 800° and 1,200° C. is mixed with a converted circulating gas and the temperature of the produced gas mixture is lowered therefore to the value between 200° and 800° C., preferably between 300° and 450° C. With this temperature the gas mixture is subjected to a dry de-dusting. Then, the de-dusted gas mixture is saturated with water vapor with the utilization of condensate produced during cooling of the product gas partial stream, and washed at the dew point of the gas for removing the residual dust and other impurities such as halogen and ammonia, from the gas. After this, the cleaned gas mixture is preheated to the initial temperature of the conversion reaction and, when it is used for adjustment of the ratio between water vapor and carbon monoxide required for the conversion, is supplied with further water vapor. The CO-conversion performed after this is conducted in presence of sulfur resistant catalysts, and between 60 and 95%, preferably between 80 and 95% of the supplied CO is converted. The gas which leaves the conversion reaction is cooled approximately to its water vapor dewpoint and then subdivided into a product gas partial stream and a circulating gas partial stream.

The separation ratio x of the circulating gas partial stream $V_k$ to the product gas partial stream $V_p$ must in the region between 0.5 and 4, preferably between 1 and 2. The converted gas which is subjected to the separation has a molar carbon monoxide/hydrogen ratio $$r_s = \frac{V_{CO}}{V_{H2}}$$

which is dependent on molar carbon monoxide-hydrogen ratio r of the partial oxidation crude gas, the separation ratio x, and the conversion rate. The following equation is applicable:

$$r_s = \frac{1-\mu}{(1+\mu \cdot x) \cdot \left(1 + \frac{1}{r}\right) - (1-\mu)}$$

wherein the sum of the volumes of carbon monoxide and hydrogen in the partial oxidation crude gas is equal to the corresponding sum of the values in the product gas partial stream while the addends are however different.

After the separation the circular gas partial stream is supplied to a condenser, in which it condenses at least to the pressure acting in the quenching zone. Then, the condensed gas is again added to the partial oxidation crude gas in the first stage of the method (stage a). The product gas partial stream is meanwhile subjected to a further indirect and/or direct cooling for water vapor condensation. The thusly produced condensate, as described hereinabove, is added to the gas mixture after the dry de-dusting. The cooled product gas is then supplied to a desulfurization and CO-removal (acid gas wash) and becomes available for a further processing.

In the flow diagram illustrating the inventive process only those parts of apparatus which are important for the inventive method are shown. All auxiliary devices, such as for example additional heat exchangers, pumps, valves, etc. as well as not important material streams are not shown. The flow diagram also does not illustrate details of the preliminary gasification device and the subsequent conversion of the produced hydrogen-rich gas. These method steps are not germain for the present invention. It should be mentioned that these method steps as well as all steps of the inventive method can be performed with known apparatus parts and aggregates.

In the process in accordance with the present invention the used fuel is supplied through a supply conduit 1 into a gasifier 2. In the gasifier the gasification (partial oxidation) of the fuel under conventional reaction conditions or with the utilization of known reaction conditions and with the utilization of known constructions of the gasifier is performed. For example, the gasifier can be formed as an air flow gasifier in which the gasification of the fuel is performed under the pressure of more than 20 bar at temperatures between 1,300° and 2,000° C. The produced partial oxidation crude gas leaves the gasifier through a conduit 3 and is supplied to a waste heat boiler 4 which in the practice can be assembled with the gasifier 2 to form a structural unit. In the waste heat boiler 4, the partial oxidation crude gas is cooled to a temperature between 600° and 1,450° C., preferably between 800° and 1,200° C. The thus produced waste heat steam is withdrawn through a conduit 5 and can be supplied for a further utilization. From the waste heat boiler 4 the gas at the corresponding temperature is supplied through a conduit 6 to a quenching zone 7. There the partial oxidation crude gas is mixed with a circulating gas supplied through a conduit 8 and simultaneously cooled. The thusly produced gas mixture must have a temperature between 200° and 800° C., preferably between 300° and 450° C. At this temperature the gas mixture is supplied through the conduit 9 to a dry dedusting 10 and released in there from entrained fine dust. After the dry dedusting 10, the gas stream exits through a conduit 11 and supplied to a saturator 12. It is brought there in contact with a condensate which is produced from the cooling of the product gas partial stream and supplied through a conduit 13 to the saturator 12. Thereby the gas is saturated with water vapor and subsequently supplied through a conduit 14 to the wet wash 15 in which it is washed at dew point temperature.

Through the conduit 16 the gas is then supplied to a heat exchanger 17 in which it is heated in an indirect heat exchange with the converted gas to a starting temperature of the conversion reaction, normally at more than 270° C. The respectively heated gas is supplied through the conduit 18 into a saturator 19 in which the water vapor required for the conversion is added. For this purpose, the steam or water vapor from the waste heat boiler 4 is used. A partial stream of this vapor is withdrawn from the conduit 5 and supplied through a conduit 20 to a saturator 19. The saturated gas is supplied through a conduit 21 to a conversion reactor 22. In this reactor the CO-conversion is performed in one or two steps in the presence of sulfur resistant catalysts. For this purpose known commercial catalysts are used, such as for example cobalt/molybdenum as active components. The converted gas is withdrawn through a conduit 23 from the conversion reactor 22 and cooled in a heat exchanger 17 as well as in a final cooler 24 approximately to its water vapor dew point. A cooling pipe system 25 of the final cooler 24 can be used for prewarming of the feed water for the waste heat boiler 4. After the final cooler 24, the converted gas withdrawn through a conduit 26 is separated into the circulating gas partial stream $\dot{V}_k$ and product gas partial stream $\dot{V}_p$ with the separating ratio:

$$X = \frac{\dot{V}_k}{\dot{V}_p}$$

in the region between 0.4 and 4, preferably between 1 and 2.

The product gas partial stream $\dot{V}_p$ is withdrawn through a conduit 27 which branches from the conduit 26 to a cooler 28. It is directly or indirectly cooled in the cooler for water vapor condensation. The thusly produced condensate is withdrawn through the conduit 13 into the saturator 12. After passing the cooler 28, the product gas partial stream is supplied through a conduit 29 into an acid gas wash 30. It is normally performed with the utilization of suitable chemically and/or physically acting washing solutions. In addition to the sulfur compounds, also $CO_2$ as well as other acid components are removed. For the desulfurization of the gas, also other processes can be used, such as for example the dry desulfurization. After the acid gas wash 30, the hydrogen-rich gas produced in this manner is available for further processing, to which it can be supplied to a conduit 31.

The circulating gas partial stream $\dot{V}_k$ is supplied through the conduit 26 to a compressor 32 in which it is compressed at least to the pressure acting in the quenching zone 7. Then, it is supplied through the conduit 8 into the quenching zone 7.

In accordance with a modification of the inventive method which is not shown in the flow diagram, a partial stream of the loaded washing water can be withdrawn from the washing water circulation of the wet wash 15 and released from the entrained solid particles and salts. Then the purified washing water can be supplied into the saturator 12 and used for water vapor saturation with the mixing gas stream. In this manner, the process is performed so that no waste water is produced.

The inventive process can be performed in correspondence with the thermodynamic boundary conditions and the performance of the CO-conversion with a technically meaningful CO-conversion rate $\mu$, in other words with a carbon monoxide conversion clearly under 100%. Lower carbon monoxide conversion rates require an increase in the separation ratio of circulating gas to product gas. A region of the carbon monoxide conversion from 60° to 95° is especially suitable with consideration of the efficient boundary conditions, or in other words, apparatus and machine costs as well as energy consumption. Operational requirements, such as change of fuel quality, load exchange, partial load and other influences can have influence on the gas composition. The continuous analytic monitoring of the molar $CO/H_2$ ratio in the product gas partial stream provides in such cases a first correction of the product gas composition by regulation in the separation ratio of the circulating gas to the product gas.

A further control possibility resides in that a part of the circulating gas and particularly 0 to 1.0 $Nm^3$/kg of water free carbon, for example 0.3 to 0.6 $Nm^3$/kg water free carbon is supplied into the burner of the gasifier 2 and used therein instead of the water vapor for temperature moderation in the gasifier 2. In this case, the circulating gas is supplied through a central lance into the burner, and the lance is surrounded by two annular spaces. The coal dust is supplied through the inner annular space, while the gasification oxygen is supplied through the outer annular space. With the partial return of the circulating gas into the burner, the quantity of oxygen is reduced in correspondence with the supplied carbon dioxide and water vapor quantity so that the gasification yield is not affected.

The efficiency of the inventive method is illustrated by an example. A hard coal is used with the following composition in water free condition:

| | |
|---|---|
| C | 76.6 weight percent |
| H | 5.0 weight percent |
| O | 8.8 weight percent |
| N | 1.3 weight percent |
| S | 0.8 weight percent |
| Ash | 7.5 weight percent |
| Cl | 0.17 weight percent (contained in ash). |

It is gasified in an air flow gasifier with dry coal dust supply (carrier agent nitrogen) with oxygen without steam supply at a pressure of 30 bar. The resulting partial oxidation crude gas in a quantity of 2.07 $Nm^3$/kg coal at the entrance of the quenching zone at a temperature of 1,100° C. has the following composition:

| | |
|---|---|
| CO | 67.9 weight percent |
| $H_2$ | 26.5 weight percent |
| $CO_2$ | 0.3 weight percent |
| $N_2$ | 4.7 weight percent |
| $H_2S$ | 0.2 weight percent |
| HCl | 0.05 weight percent |
| $H_2O$ | 0.3 weight percent |

In the above presented example a conversion ratio $=0.8$ and a separation ratio of $x=1.5$ converted gas is added to the partial oxidation crude gas in a quantity of 6.63 $Nm^3$/kg in the quenching zone with the following composition:

| | |
|---|---|
| CO | 2.9 weight percent |
| $H_2$ | 41.3 weight percent |
| $CO_2$ | 29.0 weight percent |
| $N_2$ | 2.2 weight percent |
| $H_2S$ | 0.1 weight percent |
| HCl | 0.0 weight percent |
| $H_2O$ | 24.5 weight percent |

The resulting mixture has the following composition:

| | |
|---|---|
| CO | 18.3 weight percent |
| $H_2$ | 37.8 weight percent |
| $CO_2$ | 22.2 weight percent |
| $N_2$ | 2.8 weight percent |
| $H_2S$ | 0.15 weight percent |
| HCl | 0.01 weight percent |
| $H_2O$ | 18.7 weight percent |

The mixture gas is de-dusted in a dry process at a temperature of 400° C. and then saturated in a saturator 12. For this purpose condensate as well as additionally purified washing water are supplied to the saturator 12 through the conduit 13 from the wet wash 15 in a quantity of total 0.9 1/kg $coal_{wf}$. The wet washing is performed with a temperature of 180° C., and at the end the gas in the heat exchanger 17 is heated to a temperature of approximately 300° C., at which the CO-conversion is performed. Then the cooling of the converted gas is performed in the heat exchanger 17 and in the final cooler 24 to a temperature of approximately 160° to 170° C. With the above mentioned separation ratio x=1.5, the converted gas is separated at this temperature into the circulating gas partial stream and the product gas partial stream. The circular gas partial stream is again compressed in the compressor 32 to the quenching pressure and then supplied back to the quenching zone 7. The product gas partial stream is again treated in the cooler 28 and in the acid gas wash 30 and then supplied with a molar $CO/H_2$ ratio of $r_s=0.07$ to its further utilization. For the ammonia synthesis the residual carbon monoxide content is withdrawn from the gas by known steps, such as for example in a liquid nitrogen wash, before supplying to a synthesis reactor.

The above presented example illustrates a possibility of the inventive method. With suitable selection of the separation ratio x, the temperature of the partial oxidation crude gas can be freely selected in the quenching zone in a wide region, in correspondence with the design and the output of the waste heat boiler.

It will be understood that each of the elements described above, or two or more together, may also find a useful application in other types of methods differing from the types described above.

While the invention has been illustrated and described as embodied in a method of producing a hydrogen-rich gas, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a hydrogen-rich gas with a hydrogen content of at least 85 volume percent by gasifying of finely grained to pulverulent fuels at temperatures above a slag melting point, comprising the steps of gasifying a finely grained to pulverulent fuel in a gasifier to produce a partial oxidation crude gas; indirectly cooling the partial oxidation crude gas in a waste heat boiler arranged after the gasifier; cooling again the partial oxidation crude gas after the waste heat boiler by adding converted circulating gas to the gas mixture; subjecting the produced gas mixture to a dry de-dusting; saturating the dedusted gas mixture with the use of a condensate produced during cooling of a product gas partial stream and washing at dew point of the gas mixture; subjecting the purified gas mixture after heating to a CO-conversion in the presence of a sulfur resistant catalyst in a conversion reactor; cooling a CO-poor gas leaving the conversion reactor to approximately its water vapor dew point and then subdividing in a circulating gas partial stream and a product gas partial stream; supplying the circulating gas partial stream after a compression as the converted circulating gas to the partial oxidation crude gas after the waste heat boiler for cooling the partial oxidation crude gas; and subjecting the product gas partial stream to a cooling for water vapor condensation, a de-sulfurization, a $CO_2$ removal, and a further gas treatment for a further utilization.

2. A method as defined in claim 1; and further comprising adding further water vapor to the purified gas mixture for adjusting a ratio of hydrogen to carbon monoxide required for the conversion, prior to the CO-conversion.

3. A method as defined in claim 1, wherein said separation includes separation with a separation ratio x between the circulating gas partial stream and the product gas partial stream in the region between 0.5 and 4.

4. A method as defined in claim 1, wherein said separation includes separation with a separation ratio x between the circulating gas partial stream and the product gas partial stream in the region between 1 and 2.

5. A method as defined in claim 1, wherein said cooling of the partial oxidation crude gas by adding converted circulating gas includes supplying the partial oxidation crude gas at temperatures between 600° and 1,450° C. to a quenching zone and mixing with the converted circulating gas, so that the temperature of the produced gas mixture is lowered to between 200° and 800° C.

6. A method as defined in claim 5, wherein said supplying of the partial oxidation gas to the quenching zone includes supplying at the temperatures between 800° and 1,200° C.

7. A method as defined in claim 5, wherein the temperature of the produced gas mixture is lowered to the value between 300° and 450° C.

8. A method as defined in claim 1, wherein said subjecting the purified gas mixture to a CO-conversion includes conversion of the purified gas mixture such that between 60 and 95% of supplied carbon monoxide is converted.

9. A method as defined in claim 1, wherein said subjecting the purified gas mixture to a CO-conversion includes conversion of the purified gas mixture such that between 80 and 95% of supplied carbon monoxide is converted.

10. A method as defined in claim 1; and further comprising the step of wet washing of the gas mixture, separating a partial stream of a loaded washing water on the wet washing, cleaning the separated partial stream and supplying it to a saturator.

11. A method as defined in claim 1; and further comprising the steps of continuously analytically monitoring molar $CO/H_2$ ratio in the product gas partial stream, and maintaining this ratio during operational changes by changing the separation ratio.

12. A method as defined in claim 1; and further comprising the step of changing the separation ratio by supplying a partial stream of the circulating gas partial stream in a quantity of 0.2 to 1.0 $m^3$/kg waterfree carbon to burners of the gasifier through a central lance and using the same instead of water vapor for temperature moderation during the gasification.

13. A method as defined in claim 12, wherein said supplying a partial stream of the circulating gas partial stream includes supplying the partial stream in a quantity of 0.3 to 0.6 $Nm^3$/kg waterfree carbon.

* * * * *